Nov. 20, 1962  R. W. HILTON  3,064,347
METHOD OF AND APPARATUS FOR MAKING IMPACT EXTRUSIONS
Filed Oct. 22, 1957  3 Sheets-Sheet 1
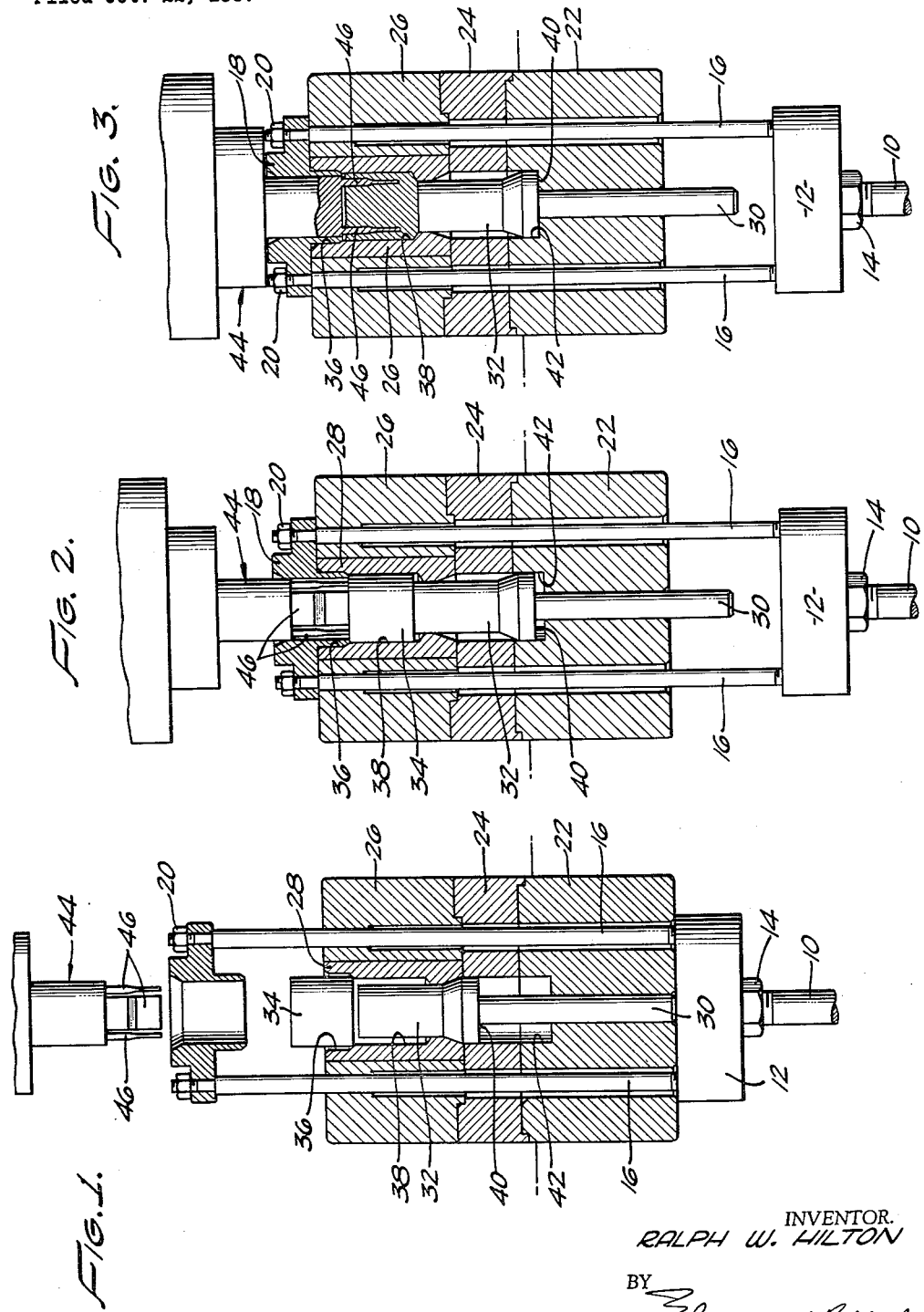
INVENTOR.
RALPH W. HILTON
BY
ATTORNEY

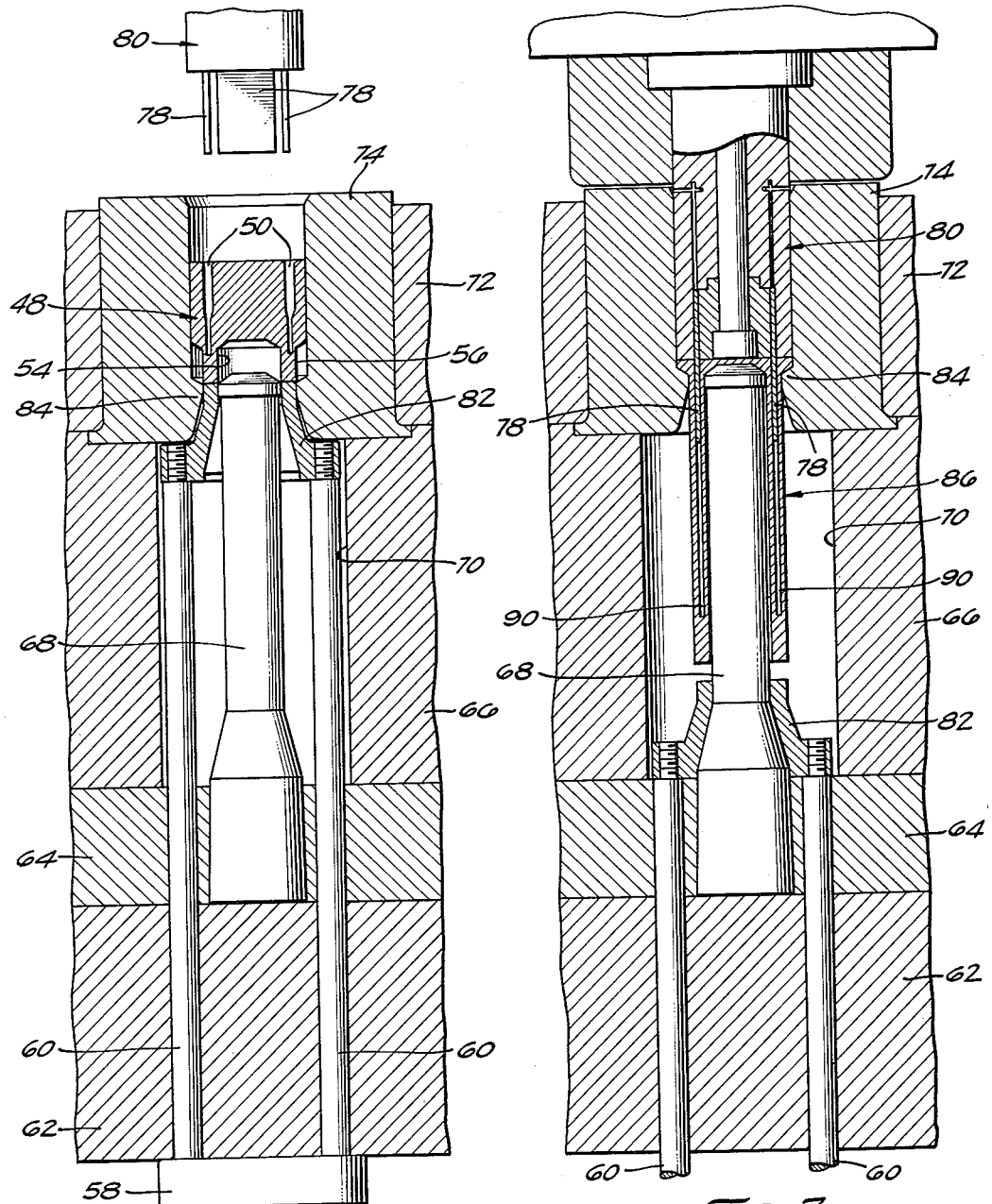

3,064,347
METHOD OF AND APPARATUS FOR MAKING
IMPACT EXTRUSIONS
Ralph W. Hilton, Palos Verdes Estates, Calif., assignor to Harvey Machine Co., Inc., Torrance, Calif., a corporation of California
Filed Oct. 22, 1957, Ser. No. 691,762
14 Claims. (Cl. 29—555)

This invention relates to a process of and apparatus for manufacturing structural members and more particularly to a method of cold working metal and apparatus for use in the performance of the method.

The invention specifically is concerned with the manufacture of deformable metal bodies made of aluminum or mild steel having a plurality of longitudinal passageways in them. This has been done in the prior art by straight extrusion methods, but not by impact extrusion methods because the latter has not been heretofore possible. Multiple piercing of a metal billet to provide a plurality of longitudinal passageways is required as a preparatory step to the actual impact extrusion step and the multiple piercing step has not heretofore been possible. This for the reason that the uniformity, both in cross section and orientation, of longitudinal passageways produced by multiple piercing has been inordinately poor. Still further, poor reproducibility, that is, poor uniformity between a plurality of billets successively pierced with the same dies, has also made impact extrusion methods for producing multicellular bodies impractical.

It is therefore an object of the invention to provide a method of piercing a metal billet uniformly in cross section in a plurality of transverse locations simultaneously while maintaining an accurate orientation of longitudinal passageways so produced.

Another object of the invention is to provide a method of piercing a plurality of metal billets successively with the same dies while maintaining uniformity in the detailed dimensions of the pierced billets.

The present invention achieves these objects and overcomes the above-described and other disadvantages of the prior art by providing a method including the step of preparing each billet for extrusion by radially compressing each billet before it is pierced.

The metal which, at the present time, will be most generally used in the method of the invention will be aluminum. Aluminum has a relatively high modulus of elasticity. According to conventional methods of piercing, a cylindrical metal billet will be located in a hollow cylindrical female die, the billet being unstressed and easily slidable into or out of the die. The elasticity of aluminum is so high that when steel punches are pressed into the metal, the metal simply spreads apart and when the punches are removed it will partially return to its original shape. Thus, the fact that a billet can move around in the die means that it will not be pierced in the same locations each time for each successive billet using the same dies. Still further, punches or projections on a male die are employed to pierce the metal billets and these will bend and will not pierce the metal billet throughout in positions of axial alignment with the female die because of the lack of lateral support and movement of the billet inside the female die.

The present invention overcomes this problem by maintaining a metal billet in radial compression by the preparatory step of pressing it into an undersize female die before it is pierced. According to the physical theory of the method, the center of the billet will always be compressed to the greatest degree, it being considered the most tightly compressed of the lattice type molecular structure of the billet.

In accordance with a feature of the invention, the billet is cylindrical or has polar symmetry in cross section and is pierced at symmetrical positions about the polar axis of symmetry. This means that, although a billet will be cold when pressed into an undersize female die, a temporary rise in temperature will be produced by this step and that this rise in temperature will be generally higher at the circumference of a billet near which piercing is to take place. Hence, piercing is accomplished more easily and more accurately because the metal of the billet which is displaced will flow more easily. Still further, compression of the metal billet by pressing it into an undersize female die gives lateral support to the punches or male die projections which are employed to pierce the billet.

According to another feature of the invention, a metal billet is extruded in an unusual fashion after it has been pierced. According to this method, steps are performed including mounting the billet on a male die having a projection to extend into each of the passageways in the billet, and moving the male die toward an open end of a female die having a closed end and a mandrel fixed to the closed end extending toward the open end in spaced relation from said projections. In this manner the billet is extruded internally in the female die over the mandrel.

Preferably apparatus used in the performance of this method includes a male die having a plurality of parallel longitudinal punches of a size desired in the passageways of the finished product, and means to move the male die punches through the open end of the female die with the punches in axial alignment with the female die, but spaced from the mandrel.

According to still another feature of the invention, a method of relieving one end of a pierced metal billet is provided in order to provide flat, closed passageways of a desired uniform cross section. If this method of the invention were not practiced, the passageways at their closed ends would simply taper off to a point. According to this feature of the invention, a step is performed before the metal is extruded, this step including removing material both inside and out of one end of a billet to arrive at the cross sectional shape of a hollow tubular member. In this case, the mandrel in the female die, in the step of actually extruding the pierced billet, is located in the inside relief provided by removal of the material from the billet.

As stated previously, a multicellular body of the type which is made in accordance with the method of the invention may also be made practically, but only by a straight extrusion process. In this process, a heated billet is extruded through a cylindrical die having longitudinal elements spaced from each other mounted inside of it on spiders provided for that purpose. Thus, metal is forced through the die and for this reason has a plurality of longitudinal passageways. The passageways are enclosed because metal flows around segments of the spider and backtogether again to form welded seams.

In this and similar straight extrusion processes, the surface of an article after it has been extruded is so poor and the orientation of the longitudinal passageways along the length of the body in articles successively extruded is so different that it is necessary to provide an excess of material in the articles which must be machined off both to provide a good smooth external surface and to provide proper orientation of the longitudinal passageways relative to the external surface of each. Still further, it is obvious that in the straight extrusion process, the passageways cannot be efficiently closed at one end in the extrusion process itself and must be closed by separate steps.

Hence, the present invention has several advantages over straight extrusion processes. In the first place, the impact extrusion of the present invention is stronger than straight extrusions produced by the above-described method because no seam welds are employed in the former. It is also an advantage of the invention that the external surface of the finished product is very smooth. Still further, the passageways made in accordance with the invention are so accurately oriented with respect to the external surface of the finished product that no additional machining but only centerless grinding is required. This means that the expensive machining step of the straight extrusion process is eliminated and the process of the invention is thereby made more economical. Still further, where such expensive materials as aluminum are involved, a reduction in scrap material in the production of the finished product by machining also provides a substantial saving. In the article disclosed hereinafter, a sixty-six percent reduction in material waste was effected.

Last, but not least, the impact extrusion process of the invention permits the extrusion of a hollow cylindrical metal body having longitudinal passageways closed at one end, the closures being integral with the material and therefore stronger than and more economical, to make than straight extrusions because a separate fabrication step is required to close the passageways in the latter type.

The above-described and other objects and advantages of the present invention will be better understood when considered with the following description taken in connection with the accompanying drawings made a part of this specification, wherein an embodiment is illustrated by way of example. The device of the present invention is by no means limited to the specific embodiment illustrated in the drawings since it is shown merely for purposes of description.

FIG. 1 is a broken sectional view of apparatus employed in the preparatory step of the invention;

FIG. 2 is a broken sectional view of the apparatus with the preparatory step performed;

FIG. 3 is a sectional view of the apparatus shown in FIGS. 1 and 2 with a cylindrical metal billet pierced with the punches employed in the male die of the apparatus of the invention;

FIG. 6 is a sectional view of a billet in apparatus employed in extruding the billet into a hollow cylindrical member with longitudinal passages in it;

FIG. 7 is a sectional view of the apparatus shown in FIG. 6 with the billet extruded;

Figure 4:
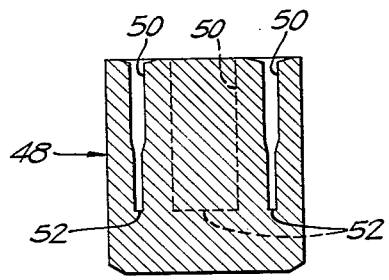
FIG. 4 is a vertical sectional view of the metal billet after it has been pierced.

In the drawings, in FIG. 1, apparatus for performing the preparatory step of the invention is shown including an operating rod 10 threaded to a base plate 12 and fixed thereto by means of a lock nut 14. Base plate 12 carries a plurality of rods 16 extending upwardly and through a hollow cylindrical member 18 and fixed thereto by means of nuts 20. Rods 16 extend upwardly through vertical bores of blocks 22, 24 and 26 employed to retain a hollow cylindrical female die 28 at the top thereof. The apparatus shown in FIG. 1 is also provided with a shaft 30 having an enlarged portion 32 at its upper end to push metal billets out of die 28 after the billets have been pierced. It is to be noted that a billet 34 is in fact located in die 28 and that die 28 has an enlarged diameter at 36 in order that billet 34 may be easily positioned inside the die 28. However, the inside diameter of the die 28 at 38 must be smaller than the diameter of the billet 34. This is one of the salient features of the invention not practiced in prior art piercing methods. It is to be noted that upper end 32 of shaft 30 provides a base against which billet 34 rests after it has been pierced as shown in FIG. 3, upper end 32 being maintained in a fixed lower position by engagement of a shoulder 40 against the lower end of an enlarged bore 42 of block 22. Shaft 30 is only operated to push a pierced billet out of die 28 after it has been pierced. In FIG. 1 a male die 44 is also shown having punches 46 of a rectangular cross section to pierce billet 34.

The preparatory step of the method of the invention is best illustrated in FIG. 2 where it is shown that cylindrical member 18 presses billet 34 in the undersize bore 38 of female die 28. In FIG. 2 billet 34 is shown being radially compressed by the undersize bore 38 of hollow cylindrical die 28. Punches 46 are positioned immediately above billet 34 preparatory to the piercing step of the invention which is illustrated in FIG. 3. It will be noted as billet 34 is pierced, the material of the billet will move upwardly in the die to approximately the position shown in FIG. 3.

It is to be understood that a billet may be pierced one or more times, depending upon the material of the billet and the depth, size and number of the punches 46. It is to be understood that if the punches are unusually large and extend into the billet an unusually long distance, it will be necessary to punch the billet several times, each succeeding time using punches longer in length but smaller in cross-section at least at their ends. In the present invention with the end product to be produced with the punches of approximately the size illustrated in the drawings, it will be preferable to pierce the billet twice. The billet, after it has been pierced twice, will generally have the shape as indicated at 48 in FIG. 4, longitudinal passageways being indicated at 50.

It is to be noted that passageways 50 are closed at an end 52. This is not necessary in view of the fact that punches 46 can extend completely through billet 34. However, in some applications, it may be desirable to keep the ends 52 closed and rectangular rather than have them taper off. For this reason, the interior and exterior 54 and 56 of pierced body 48 is preferably machined so that the square corners of closed ends 52 may be maintained in a subsequent extrusion process as will be explained in connection with FIGS. 6 and 7. The pierced body 48 is shown in a vertical sectional view in FIG. 5 after it has been machined at 54 and 56.

It is to be understood that both the apparatus shown in FIGS. 1, 2 and 3 and the apparatus shown in FIGS. 6 and 7 are both intended to be operated by presses or equivalent power means. In FIG. 6, a base plate 58 is shown from which rods 60 are connected and extend upwardly through three blocks 62, 64 and 66 employed to house and maintain a mandrel 68 in a fixed concentric position with respect to a hollow cylindrical bore 70 of block 66. A block 72 is then provided to retain a hollow cylindrical female die 74 into which a pierced and machined piece 48 has been inserted. It will be understood that piece 48 generally will be mounted on rectangular projections 78 of a male die 80. Similar to member 32 shown in FIGS. 1, 2 and 3, a hollow cylindrical member 82 is threaded to the upper ends of rods 60 to push an extruded piece upwardly over mandrel 68 so that it may be removed from die 74 after extrusion has been performed. During the actual extrusion process, member 82 will be located at its extreme lower position as indicated in FIG. 7.

In the extrusion method of the invention, the hollow bore 54 of pierced and machined piece 48 is located over the drop of mandrel 68 with projections 78 of male die 80 extending into longitudinal passageways 50 of piece 48. Likewise the exteriorly machined portion 56 of piece 48 fits in between circumferential hardened extruding portion 84 of die 74 and piece 48 is pushed over mandrel 68 to extrude the material thereof as indicated at 86 shown in FIG. 7. A clear sectional view of piece 86 is shown in vertical section of FIG. 8. The irregularly shaped upper end of piece 86 may be machined off to provide a finished article 88. Longitudinal passageways 90 are indicated in all three FIGS. 8, 9 and 10. The cylindrical bore of the piece 88 is indicated at 92 as is the cylindrical bore of piece 86. The cross sectional shape of longitudinal passageways 90 shown in the enlarged transverse sectional view of piece 88 need not be maintained except for a particular application. It is to be noted that longitudinal passageways 90 need not be approximately rectangular but may be circular or may have other cross sectional shapes.

As stated previously, one of the salient features of the invention resides in the method step of pressing billet 34 in undersize bore 38 of hollow cylindrical female die 28. The metal which at the present time will be most generally used in the method with the apparatus of the invention will be aluminum. It will be noted that aluminum has a high modulus elasticity and according to conventional methods of piercing, a cylindrical aluminum billet would be located in a hollow cylindrical female die in an unstressed manner. However, this has several disadvantages, non-uniformity being the greatest of these. However, in accordance with the present invention, unusually good uniformity between successive pieces fabricated with the same dies may be produced in accordance with the method and apparatus of the invention. Still further, uniformity in the cross section and orientation of the longitudinal passageways 90 shown in FIG. 10 may be made with the method and appaartus of the invention. Thus, multiple piercing has been made practical by the method and apparatus of the invention whereas it was not in the prior art. Still further, by use of the unusual apparatus and method in extruding the piece 86, the method and apparatus employed in extrusion steps illustrated in FIGS. 6 and 7 make possible mass production of integral bodies having longitudinal passageways, this not being possible in the case of straight extrusions of the prior art.

Figure 5:
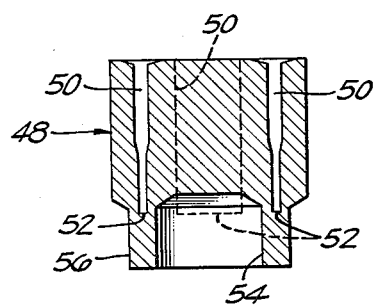
FIG. 5 is a sectional view of the billet after one end has been machined in order to provide for square corners at the ends of longitudinal passageways pierced in the billet.
Figure 8:
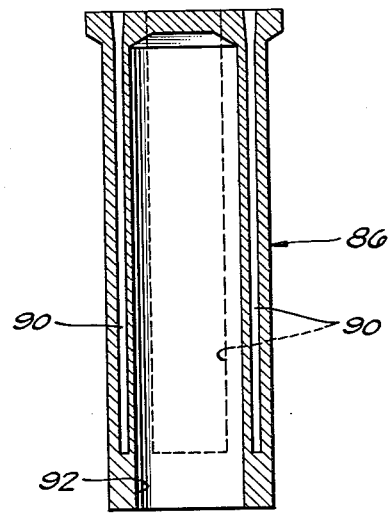
FIG. 8 is a sectional view of the article after it has been extruded as shown in FIG. 7.
Figure 9:
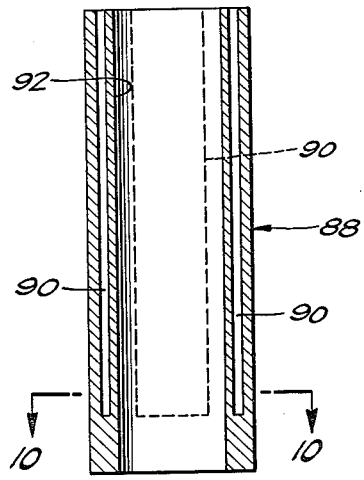
FIG. 9 is a longitudinal sectional view of the finished article.

According to a further feature of the invention, machining of the interior and exterior 54 and 56 at the lower end of the pierced piece 48 shown in FIG. 5 enables production of square corners in the longitudinal passageways 90 shown in FIGS. 7, 8 and 9.

Figure 10:
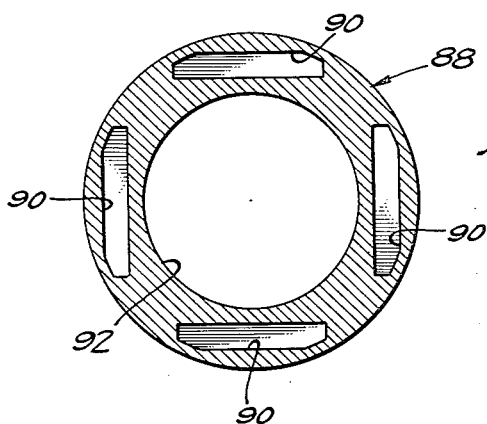
FIG. 10 is a transverse sectional view of the finished article taken on the line 10—10 shown in FIG. 9.

As stated previously, the external surface of the finished product 88 shown in FIGS. 9 and 10 is so much better than finished products of a straight extrusion process that expensive machining may be eliminated. Still further, a substantial saving in material waste of the finished product is also possible in that for the specific finished product 88 shown, a 66% reduction was made in actual fact.

Although only certain specific method steps and apparatus have been illustrated and described, it is to be understood that the invention is by no means limited to those shown since they have been shown merely for purposes of description. Many changes and modifications of the invention will, of course, suggest themselves to those skilled in the art. Hence the invention is not to be limited by the specific showing or description, the true scope of the invention being defined only in the appending claims.

What is claimed is:

1. The method of producing a plurality of longitudinal passageways in a cylindrical metal billet in transverse positions having approximately polar symmetry about the axis of the billet, said method comprising the steps of: pressing the billet into an undersize cylindrical female die; axially piercing the billet at said plurality of transverse positions and along the length of said billet to a point spaced from one end; and to a depth along only that length of the billet which has a cross-section larger than that of said female die, to hold said billet in transverse compression all along the length thereof that the same is pierced, removing material inside and on the outside of said billet at said one end to an axial position within the billet beyond the closed ends of said longitudinal passageways to provide a hollow cylinder having a wall thickness equal to that desired in the finished product; mounting the billet on a male die having projections to extend into the passageways formed by said piercing step; and moving said male die and said billet into an open end of a cylindrical female die having a cylindrical mandrel fixed thereto in a symmetrical position inside it with said projections of said male die disposed between the cylindrical surface of said female die and said mandrel to extrude said billet into a hollow cylinder around and along the length of said mandrel with longitudinal passageways in said billet produced by the location of said projections in the space between the cylindrical surface of said female die and said mandrel, said mandrel fitting into a recess formed in said billet by said removal of material inside it at said one end.

2. The method of cold working a metal billet to produce a plurality of longitudinal passageways therethrough, said method comprising the steps of: forcing an unheated billet into an undersized female die having a smaller cross section than that of the billet; and axially piercing holes in one end of the unheated billet at a plurality of circumferentially spaced positions simultaneously to a depth spaced from the other end thereof opposite said one end; and removing the material of said billet both at the center thereof and externally thereof spaced from said holes along the length of said billet from the end of the holes therein to said other end thereof, whereby the billet may be extruded with a uniform cross section.

3. The method of cold working a metal billet to produce a plurality of longitudinal passageways therein, said method comprising the steps of: forcing a cylindrical unheated billet into an undersized cylindrical female die having an inside diameter smaller than the outside diameter of the billet; axially piercing holes in one end of the unheated billet at a plurality of circumferentially and symmetrically spaced positions simultaneously to a depth spaced from the other end thereof opposite said one end while the unheated billet is radially compressed in said die; and removing the material of said billet both at the center thereof and externally thereof spaced from said holes along the length of said billet from the end of the holes therein to said other end thereof, whereby the billet may be extruded with a uniform cross section.

4. The method of extruding a metal billet into a generally hollow elongated shape having a plurality of passageways extending longitudinally therethrough, said method comprising the steps of: forcing an unheated billet into an undersized receptacle-shaped body having a smaller cross-section than that of the billet; axially piercing one end of the unheated billet at a plurality of circumferentially spaced positions simultaneously to a predetermined depth therein spaced from the other end thereof opposite said one end and along only that length of the billet which has a cross-section larger than that of the receptacle-shaped body, said billet thereby being held in transverse compression all along the length thereof that the same is pierced; removing the material of said billet both at the center thereof and externally thereof spaced from holes pierced therein, whereby the billet may be extruded with a uniform cross-section; mounting said billet on a male die having punches fixed thereto extend into the holes pierced in said billet, said punches being parallel elongated pin-shaped bodies; and moving said male die longitudinally through a female die with said punches moving in an annular space between said female die and a mandrel in alignment therewith, said female die having an orifice, said mandrel being fixed relative to said female die with one end of said mandrel located in a position in said female die orifice spaced therefrom, the other end of said mandrel being fixed relative to said female die on the side of said female die opposite the side from which the said male die is moved therethrough, said billet thereby being extruded into a hollow cylinder around and along the length of said mandrel with longitudinal passageways therein produced by the location of said punches in the holes pierced in the said billet and the movement of the said punches in the space between said female die orifice and said mandrel.

5. The method of extruding a metal billet into a generally hollow elongated shape having a plurality of passageways extending longitudinally therethrough, said method comprising the steps of: forcing an unheated billet into an undersized receptacle-shaped body having a smaller cross-section than that of the billet; axially piercing holes in one end of the unheated billet at a plurality of circumferentially spaced positions simultaneously to a depth spaced from the other end thereof opposite said one end and along only that length thereof which has a cross-section larger than that of said receptacle-shaped body, said billet thereby being held in transverse compression all along the length thereof that the same is pierced; removing the material of said billet both at the center thereof and externally thereof spaced from said holes, whereby the billet may be extruded with a uniform cross-section; mounting said billet on a male die having punches fixed thereto to extend into the holes pierced in said billet, said punches being parallel elongated, pin-shaped members; and extruding said billet between said male die and a female die on a mandrel, said female die having a die orifice, said mandrel having one end located in a position in said die orifice spaced therefrom, the other end of said mandrel being fixed relative to said female die on the side thereof opposite the side through which said male die is moved, said mandrel being in axial alignment with said female die, said punches being in axial alignment with but spaced from both said female die and said mandrel, said billet thereby being extruded into a hollow cylinder around and along the length of said mandrel with longitudinal passageways in said cylinder produced by the location of said punches in the pierced holes in said billet and the movement of said male die into said female die with the punches fixed thereto extending into the space between said female die orifice and said mandrel.

6. The method of extruding a metal billet into a hollow cylinder having a plurality of longitudinal passageways extending therethrough, said method comprising the steps of: forcing a cylindrical unheated billet into an undersized cylindrical, receptacle-shaped body having an inside diameter smaller than the outside diameter of the billet; axially piercing holes in one end of the unheated billet at a plurality of circumferentially and symmetrically spaced positions simultaneously to a depth spaced from the other end thereof opposite said one end and along only that length thereof which has a cross-section larger than that of said receptacle-shaped body, said billet thereby being held in transverse radial compression all along the length thereof that the same is pierced; removing material of said billet at the center thereof and externally thereof spaced from said holes whereby the billet may be extruded with the uniform cross-section; mounting said billet on a male die having punches fixed thereto to extend into the holes pierced in said billet, said male die being cylindrical, said punches being elongated, pin-shaped circumferentially and symmetrically spaced members; and moving said male die through a female die with said punches moving in an annular space between said female die and a mandrel spaced therefrom to extrude said billet; said female die being cylindrical and having a minimum inside diameter sufficiently large to be radially spaced from said punches, said female die having an orifice, said mandrel being cylindrical and having one end located in a position in said die orifice spaced therefrom, the other end of said mandrel being fixed relative to said female die to hold said one end thereof in a symmetrical position in said female die orifice, whereby an annular space exists therebetween, said mandrel having an outside diameter and being positioned to fit inside said male die punches spaced therefrom, the movement of said male die into said female die being guided to produce the movement of said punches therewith axially through said annular space in spaced relation to both said female die and said mandrel, said billet thereby being extruded into a hollow cylinder around and along the length of said mandrel with longitudinal passageways in said cylinder produced by the location of said punches in the pierced holes in said billet and movement of said punches in the space between said female die orifice and said mandrel.

7. The method of making a plurality of longitudinal passageways in a hollow body, said method comprising the steps of: forcing at least one end of an unheated billet of a predetermined unstressed cross-section into a position lying wholly within a portion of a female die having a cross-section smaller than said predetermined cross-section; and axially piercing said one end of said billet by forcing a plurality of spaced projections through the end surface of said one end at a plurality of corresponding transverse positions thereon simultaneously while maintaining said one end of said billet in said portion of said female die.

8. The method of cold working a metal billet to produce a hollow, cylindrical body having a plurality of longitudinal passageways therethrough, said method comprising the steps of: forcing at least one end of a cylindrical unheated billet of a predetermined unstressed-diameter into a position lying wholly within a portion of a cylindrical cavity having a diameter smaller than said predetermined diameter; and piercing said one end of said billet by forcing a plurality of spaced projections through the end surface of said one end at a plurality of corresponding transverse positions thereon simultaneously while maintaining said one end of said billet in position of said portion of said cavity.

9. The method of cold working a metal billet to produce a hollow body having a plurality of longitudinal passageways therein, said method comprising the steps of: forcing at least one end of an unheated billet of a predetermined unstressed cross-section into a position lying wholly within a portion of a female die having a cross-section smaller than said predetermined cross-section; and axially piercing said one end of said billet by forcing a plurality of spaced projections through the end surface of said one end at a plurality of corresponding symmetrically spaced positions thereon simultaneously while maintaining said one end of said billet in position in said portion of said female die.

10. The method of cold working a metal billet to produce a hollow body having a plurality of longitudinal passageways therethrough, said method comprising the steps of: forcing the entire length of an unheated billet of a predetermined unstressed cross-section into a position lying wholly within a portion of a female die having a cross-section smaller than said predetermined cross-section; and axially piercing said one end of said billet by forcing a plurality of spaced projections through the end surface of said one end at a plurality of corresponding transverse positions thereon simultaneously while maintaining said one end of said billet in position in said portion of said female die.

11. Apparatus for use in extruding a metal billet pierced at a plurality of transverse positions and thereby having parallel longitudinal passageways therein, said apparatus comprising: a movable male die having a plurality of parallel elongated, pin-shaped punches to fit inside the longitudinal passageways of the billet; a female die having a minimum inside diameter to be laterally spaced from said punches and having a die orifice; a mandrel; mounting means on one side of said female die opposite the side on which said male die is positioned to maintain said mandrel in a fixed position relative to and in alignment with said female die one end of said mandrel located in a position in said female die orifice spaced therefrom but being laterally spaced therefrom to provide an annular space therebetween, said mandrel having a cross sectional dimension and being positioned by said mounting means to fit inside said punches spaced therefrom; and means to guide movement of said male die in a manner to produce movement of said punches therewith axially through said annular space between said female die and said mandrel in spaced relation to each.

12. Apparatus for use in extruding a metal billet pierced at a plurality of transverse positions and thereby having parallel longitudinal passageways therein, said apparatus comprising: a movable cylindrical male die having a plurality of parallel elongated, pin-shaped circumferentially and symmetrically spaced punches, said punches being adapted to fit inside the longitudinal passageways of said billet; a cylindrical female die having a minimum inside diameter sufficiently large to be laterally spaced from said punches and having a die orifice; a cylindrical mandrel, said mandrel having a larger cross-section and a longer length than the cross-section and length, respectively, of each of said punches; mounting means on one side of said female die opposite the side on which said male die is positioned to maintain said mandrel in a fixed position relative to and in alignment with said female die with one end of said mandrel located in a position in said female die orifice spaced therefrom but being laterally spaced therefrom to provide an annular space therebetween, said mandrel having an outside diameter and being positioned by said mounting means to fit inside said punches spaced therefrom; and means to guide movement of said male die to produce movement of said punches therewith axially through said annular space between said female die and said mandrel in spaced relation to each.

13. Extrusion apparatus comprising: a movable male die having a plurality of parallel elongated, pin-shaped punches; a female die having a minimum inside diameter to be laterally spaced from said punches and having a die orifice; a mandrel, said mandrel having a larger cross-section and a longer length than the cross-section and length, respectively, of each of said punches; mounting means on one side of said female die opposite the side on which said male die is positioned to maintain said mandrel in a fixed position relative to and in alignment with said female die with one end of said mandrel located in a position in said female die orifice spaced therefrom but being laterally spaced therefrom to provide an annular space therebetween, said mandrel having a cross sectional dimension and being positioned by said mounting means to fit inside said punches spaced therefrom; and; means to guide movement of said male die in a manner to produce movement of said punches therewith axially through said annular space between said female die and said mandrel in spaced relation to each.

14. Extrusion apparatus comprising: a movable male die having a plurality of parallel elongated, pin-shaped punches; a cylindrical female die having a minimum inside diameter sufficiently large to be laterally spaced from said punches and having a die orifice; a cylindrical mandrel, said mandrel having a larger cross-section and a longer length than the cross-section and length, respectively, of each of said punches; mounting means on one side of said female die opposite the side on which said male die is positioned to maintain said mandrel in a fixed position relative to and in alignment with said female die with one end of said mandrel located in a position in said female die orifice spaced therefrom but being laterally spaced therefrom to provide an annular space therebetween, said mandrel having an outside diameter and being positioned by said mounting means to fit inside said punches spaced therefrom; and means to guide movement of said male die to produce movement of said punches therewith axially through said annular space between said female die and said mandrel in spaced relation to each.

References Cited in the file of this patent

UNITED STATES PATENTS

| | | |
|---|---|---|
| 1,292,106 | Shonnard | Jan. 21, 1919 |
| 1,295,512 | Jockmus | Feb. 25, 1919 |
| 1,376,373 | Huntoon | Apr. 26, 1921 |
| 1,588,246 | Lyman | June 8, 1926 |
| 1,955,243 | Libergeld et al. | Apr. 17, 1934 |
| 2,142,704 | Sparks | Jan. 3, 1939 |
| 2,161,419 | Kipperman et al. | June 6, 1939 |
| 2,203,376 | Witte | June 4, 1940 |
| 2,217,194 | Bryce et al. | Oct. 8, 1940 |
| 2,669,769 | Peterson | Feb. 23, 1954 |
| 2,675,124 | Biginelli | Apr. 13, 1954 |
| 2,859,869 | Nolf | Nov. 11, 1958 |
| 2,891,298 | Kaul | June 23, 1959 |
| 2,954,121 | Benson | Sept. 27, 1960 |

FOREIGN PATENTS

| | | |
|---|---|---|
| 718,957 | France | Nov. 13, 1931 |
| 1,147,176 | France | June 3, 1957 |
| 716,532 | Great Britain | Oct. 6, 1954 |

OTHER REFERENCES

"Extrusion of Aluminum Parts for Douglas Aircraft", by J. R. Boston, pages 139–147 of "Machinery", July 1945.